Dec. 27, 1955  E. WILDHABER  2,728,586
STEERING MECHANISM WITH FLUID SNUBBING MEANS
Filed June 2, 1950  5 Sheets-Sheet 1

INVENTOR.
ERNEST WILDHABER
BY
ATTORNEY

Dec. 27, 1955    E. WILDHABER    2,728,586
STEERING MECHANISM WITH FLUID SNUBBING MEANS
Filed June 2, 1950    5 Sheets-Sheet 2

INVENTOR.
ERNEST WILDHABER
BY
ATTORNEY

INVENTOR.
ERNEST WILDHABER
BY
ATTORNEY

Dec. 27, 1955  E. WILDHABER  2,728,586
STEERING MECHANISM WITH FLUID SNUBBING MEANS
Filed June 2, 1950  5 Sheets-Sheet 4
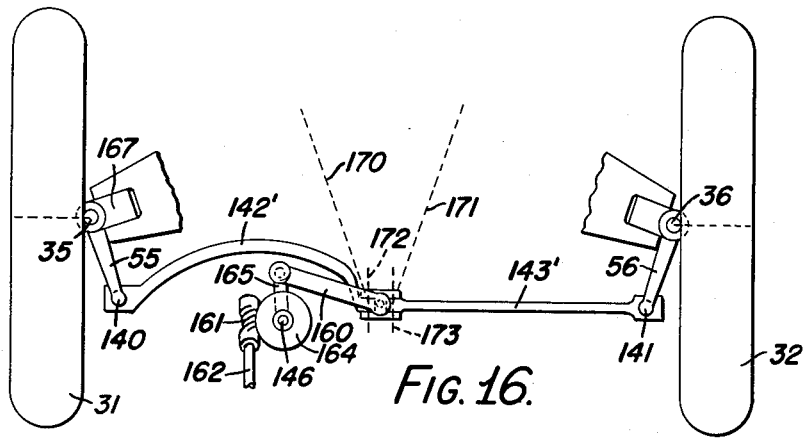
FIG. 16.
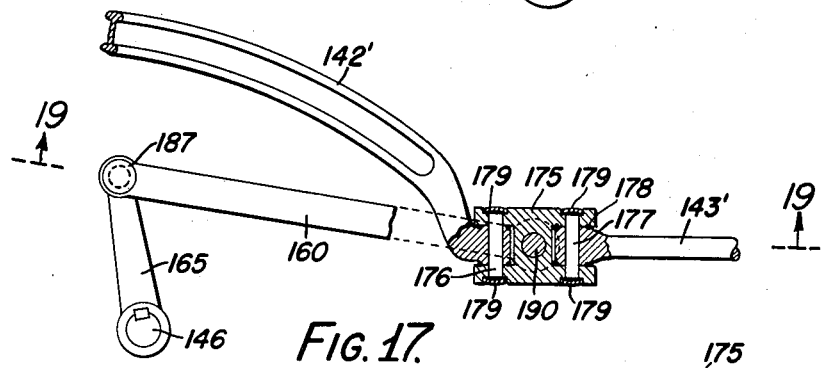
FIG. 17.
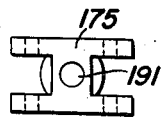
FIG. 18.
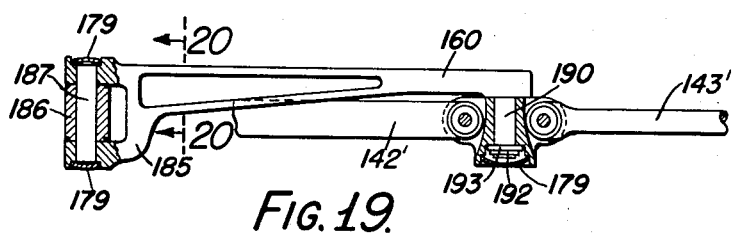
FIG. 19.
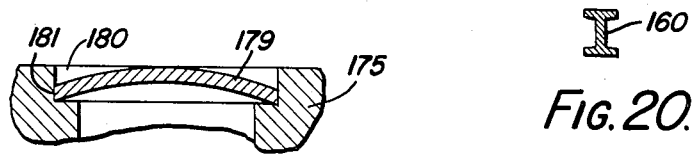
FIG. 20.
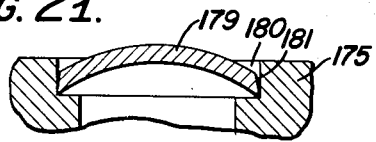
FIG. 21.
FIG. 22.
INVENTOR.
ERNEST WILDHABER
BY
ATTORNEY Dec. 27, 1955  E. WILDHABER  2,728,586
STEERING MECHANISM WITH FLUID SNUBBING MEANS
Filed June 2, 1950  5 Sheets-Sheet 5

INVENTOR.
ERNEST WILDHABER
BY
ATTORNEY

United States Patent Office 2,728,586
Patented Dec. 27, 1955

2,728,586

STEERING MECHANISM WITH FLUID SNUBBING MEANS

Ernest Wildhaber, Brighton, N. Y.

Application June 2, 1950, Serial No. 165,614

7 Claims. (Cl. 280—90)

The present invention relates to steering mechanisms for automotive vehicles, such as automobiles, buses, trucks, and the like. More particularly, the invention relates to a steering mechanism of the type disclosed in my pending U. S. patent application Serial No. 162,196, filed May 16, 1950. In a more specific aspect, the invention relates to a steering mechanism of unsymmetrical design in which the wheels are operated through linkages from a pivoted member which is offset to one side of the longitudinal center line of the vehicle. In a still more specific phase, the invention relates to steering mechanisms for vehicles having independently-sprung front wheels.

Where a vehicle has independently-sprung front wheels, steering may be effected from a centrally disposed pivoted member with a bell-crank lever which is operated through a linkage and gears from the steering wheel and which effects the swivelling of the front wheels through a linkage. This is a complicated mechanism. In another known type of steering mechanism, an offset pivoted member is connected by a tie rod directly to one knuckle arm and indirectly through a second tie rod to the other knuckle arm. With this latter steering mechanism, however, a change of steering position occurs with change of springing position; and steering errors also arise because of the linkage used.

A widely-used mounting for independently sprung front wheels is the so-called parallel linkage having levers of different lengths. The upper lever is shorter than the lower lever.

One object of the present invention is to provide a steering mechanism of simple construction and design.

A further object of the invention is to provide a simplified form of steering mechanism especially for vehicles having independently-sprung front wheels.

Another object of the invention is to provide a steering mechanism for vehicles with independently-sprung front wheels, from which the bell-crank can be eliminated and which will be more direct in operation and more rigid.

A further object of the invention is to provide a simplified steering mechanism for vehicles with independently-sprung front wheels, whose motion is at least as true as the motion produced by the well known trapezoidal steering linkage on rigid axles, and with which the steering will be unaffected by the springing position of the wheels.

Another object of the invention is to provide a steering mechanism in which the steering position is made independent of springing through the use of an articulated link or connecting element whose portion of articulation is constrained to move in a plane.

A further object of the present invention is to provide a steering mechanism in which advantage is taken of the so-called parallel linkage design for independently-sprung front wheels when driving the steering mechanism from a pivoted member which is offset from the longitudinal center line of the vehicle.

Another object of the invention is to provide a shock absorber in the steering mechanism which will keep out road shocks from the steering gear and the steering wheel.

Another object of the invention is to combine a shock absorber with the gear of the pivoted control member of a steering mechanism, and especially with the gear of a pivoted control member that is offset laterally from the longitudinal center line of the vehicle.

Another object of the invention is to provide a shock absorber for the steering mechanism of an automotive vehicle which is so constructed that high hydraulic pressure is kept away from the oil seals in order to avoid leakage.

A further object of the invention is to provide an improved type of angular worm drive particularly useful for steering mechanism.

Other objects of the invention will be apparent hereinafter from the specification and from the recital of the appended claims.

In the drawings:

Fig. 16 is a plan view of a slightly modified embodiment of the invention containing, however, the features illustrated diagrammatically in Fig. 14;

Fig. 17 is a fragmentary plan view, with parts shown in section, and illustrating part of the mechanism of Fig. 16 on a larger scale;

Fig. 18 is a detail view showing one of the parts of the mechanism of Figs. 16 and 17;

Fig. 19 is a part elevational view, part section on the line 19—19 of Fig. 17, looking in the direction of the arrows;

Fig. 20 is a section on the line 20—20 of Fig. 19, looking in the direction of the arrows;

Figs. 21 and 22 are fragmentary sectional views showing a seal, such as may be used in the steering mechanism of the present invention, after and before tightening;

Figure 1:
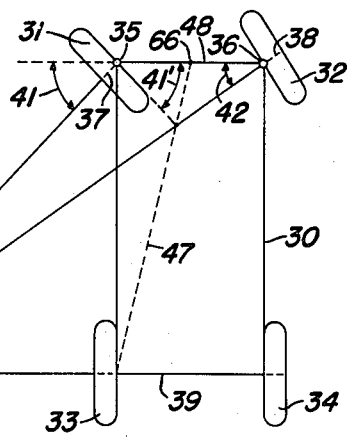
Figs. 1 and 2 are diagrams illustrating the relationship to be observed between the steering angles of the two opposite wheels of a vehicle in order to obtain true rolling motion.

Reference will now be had to the drawings for a more detailed description of the invention. In Fig. 1, 30 denotes the chassis or frame of an automotive vehicle. 31 and 32 are the front wheels of this vehicle and 33 and 34 the rear wheels. To obtain pure rolling motion and to minimize wear on the two wheels, when the front wheels 31 and 32 are turned to the right or to the left, the latter being shown in Fig. 1, they should be swivelled at different rates on their pivots 35 and 36. The inner wheel should be swivelled more. True rolling occurs when all the wheel axes 37, 38 and 39 intersect in a point 40 lying on the extended axis 39 of the rear wheels 33 and 34.

Figure 2:
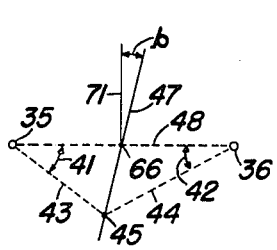

In Fig. 2, the required relationship is shown in a different way. The angle 42 is plotted from the knuckle center 36 as in Fig. 1, but the swivel angle 41 is plotted from the knuckle center 35 in the opposite direction from Fig. 1, as indicated at 41' in Fig. 1. The legs 43 and 44 of the angles 41 and 42 then intersect at a point 45 of straight line 47, if the angles fulfill the relationship indicated in Fig. 1. This known property can readily be demonstrated mathematically. The line 47 is inclined to the longitudinal direction of the vehicle at an angle $b$ which depends on the proportion of the distance L between the pivots 35 and 36 to the wheel base W of the vehicle. Line 47 intersects line 48 (Fig. 1) in a point midway between the knuckle centers 35 and 36. The angle $b$ fulfills the equation:

$$\tan b = \frac{L}{2W}$$

as known.

In actual practice the steering or swivel angles 41 and 42 need not exactly fulfill this desired relationship. The closer they approach this relationship, however, the nearer pure rolling is attained. When the actual angles are plotted in a diagram like that of Fig. 2, the inclined legs 43 and 44 of the angles may intersect in points that lie on a curve. This curve indicates the errors of the steering linkage and may be considered the characteristic curve for the linkage.

Figure 5:
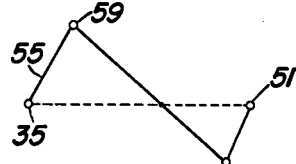
Figure 6:
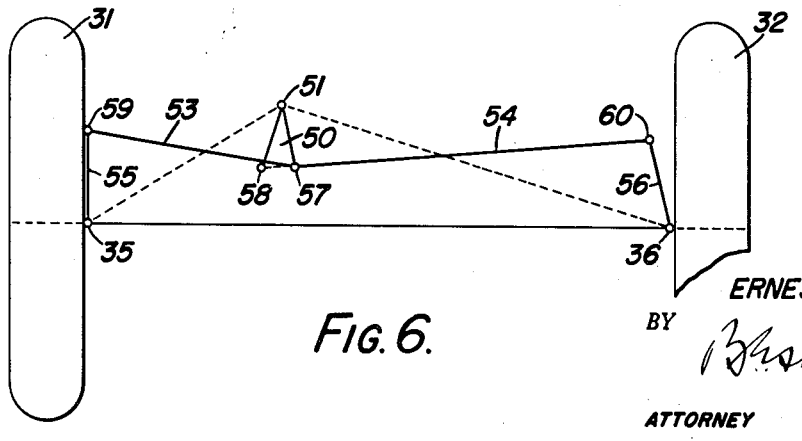
Fig. 6 is a diagram showing the assembled linkage in the central steering position, that is, in the position for straight driving.

In Fig. 6 I have shown a steering linkage constructed according to one embodiment of this invention. As before, the numerals 35 and 36 denote the knuckle or swivel centers of the wheels 31 and 32, about which the front wheels swivel when the vehicle is turned. Ordinarily the knuckle axes are inclined to be vertical in practice. My invention does not alter this conventional construction, but for convenience in illustration, this slight inclination has not been specifically shown in the diagram. For purpose of explanation we may asume that the axes are vertical and perpendicular to the drawing plane of Figs. 3 to 6 inclusive.

In my invention, steering is done by pivotal movement of a pivoted member 50 which has a vertical or a substantially vertical pivot 51. The member 50 is connected by links or tie rods 53 and 54, respectively, with the knuckle arms 55 and 56, the tie rod 53 being connected at opposite ends by means of ball joints 57 and 59 with the pivoted member 50 and the knuckle arm 55, respectively, and the tie rod 54 being connected by means of ball joints 58 and 60 with the pivoted member 50 and knuckle arm 56, respectively.

Figure 3:
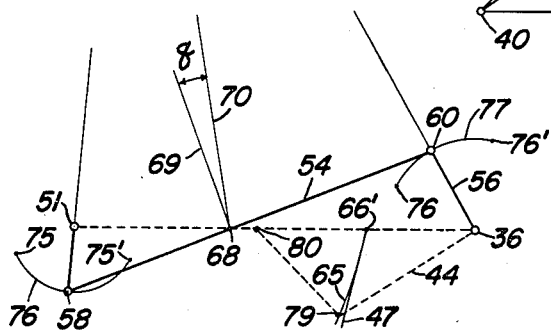
Figs. 3, 4 and 5 are diagrams illustrating the operation of the linkage elements used in one embodiment of this invention.
Figure 4:
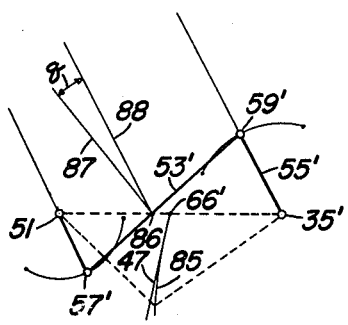

One of the steering linkages of the mechanism, which is illustrated as a whole in Fig. 6, is shown in Fig. 3. The other linkage of the assembly is shown in Figs. 4 and 5. Referring first to Fig. 3, the linkage shown is the linkage 51—58—60—36. It is designed according to the principles laid down in my co-pending application above mentioned. It is so laid out that its characteristic curve 65 is tangent to the line 47 at point 66', which corresponds to the mid point 66 of Fig. 1.

The basis on which this linkage is laid out will now be described. After assuming the instantaneous ratio in the mean position, the instantaneous axis 68 of motion is located on the center line 51—36 at a point whose distances from centers 51 and 36 are in the proportion of the instantaneous ratio. The tie rod line 54 is drawn through the point 68 to the joint 60 whose position and distance from the knuckle axis 36 is assumed. A normal 69 to the tie rod 54 is then erected at the instantaneous center 68. Line 70 is drawn through the instantaneous center 68 at an inclination angle $q$ to the normal 69. The angle $q$ is determined as described in my co-pending application referred to above. Let $b$, as indicated above, denote the inclination of the line 47 (Fig. 2) to the direction to which the characteristic curve shall be tangent at the point 66'. Line 71 denotes the lengthwise direction of the vehicle, and is perpendicular to line 18. Angle $q$ is then computable as follows:

$$\tan q = 2 \tan b \cdot \frac{51-68}{51-36}$$

Line 70 intersects the knuckle arm 56 at a distant point not shown. Line 51—58 is now drawn so that its extension passes through said intersection point. In other words, line 70 and extended lines 56, and 51—58 intersect in the same point. When this relationship is observed the characteristic curve of the individual linkage, plotted as in Fig. 2, has the desired inclination $b$ at the mean point 66 or 66'.

Points 75, 75' are equally spaced from the point 58 on circle 76 described about the point 51 when the linkage is operated. The angles 58—51—75 and 58—51—75' are thus equal and opposite turning angles of the pivoted member 50. The points 75, 75' have corresponding points 76, 76' on the circle 77 described by point 60 about center 36. The point 76 corresponds to the turning position of the linkage when the ball joint 58 is in the position 75. It is obtained by spacing the length 58—60 of the tie rod from the point 75 onto the circle 77. Point 76' corresponds to the turning position of the linkage where the joint 58 has moved to the position 75'. It is likewise obtained by spacing the length of the tie rod 58—60 from the point 75' onto the circle 77.

A point 79 of the characteristic curve 65 of the steering mechanism is obtained by plotting the swivel angle 60—36—76 from the point 36 downwardly so that distance 51—36 is one leg of the angle; and by plotting the different swivel angle 60—36—76' from a point 80 downwardly so that 80—36 is one leg of the angle. Point 80 is on line 51—36 at a distance from point 36 equal to the distance 51—35 (Fig. 6) or distance 51—35' of Fig. 4.

Other points of the curve 65 are determined in the same way after spacing other points equally from the point 58 on circle 76. This method of plotting has been more fully described in my co-pending application. It should be noted that the curve 65 of the individual linkage shown in Fig. 3 is tangent to line 47 at mean point 66' and that it departs to the left from the straight line 47.

Referring now to the other linkage, the pivoted member 50, tie rod 53, and steering arm 55 constitute the individual linkage shown in Fig. 5. A linkage symmetrical thereto is shown in Fig. 4. It is preferred to consider this latter linkage because it has the same arrangement as the individual linkage of Fig. 3. The stationary axes of this linkage are at 51 and 35'. The latter corresponds to the center 35 of the steering knuckle. The connecting link or tie rod 53' has joints 57' and 59', respectively, at opposite ends by means of which it is connected with the pivoted member and the knuckle arm 55', respectively. This linkage is similar to the linkage of Fig. 3 with the exception that it has a smaller center distance. It has the same instantaneous ratio at the middle position, and it is preferably designed to give a characteristic curve 85 also tangent to the straight line 47 at mean point 66'. Accordingly the procedure for laying out this linkage is the same as already described. The angular position of the knuckle arm 35'—59' and its length are assumed. The length is preferably kept the same as the length 36'—60 of the other knuckle arm. The tie rod is drawn through 59' and instantaneous axis 86. The normal 87 to the tie rod is erected at 86; and straight line 88 is drawn through point 86 at an inclination $q$ to normal 87. The angle $q$ is the same angle as used in Fig. 3. Again, the extended line 51—57' should pass through the intersection point of the line 88 and the extended line 55'. Computation may be used in place of drawing.

The characteristic curve 85 is plotted as above described for the curve 65. It is seen that it is tangent to the straight line 47 at point 66' and that it departs to the right from this straight line.

The shape of the characteristic curve can be altered by assuming a different inclination of the knuckle arm in its mean position, that is, a different turning angle. When the described procedure is then repeated all the characteristic curves so determined will be tangent to the line 47 at point 66'. However they will depart from said line by varying degrees. To get a complete linkage giving very little departure from the true rolling motion, it is not necessary that the characteristic curves of the two simple linkages coincide practically with the straight line 47. But if they depart from this line, they should preferably depart from it on opposite sides, and about equally. This has been accomplished with the curves 65 and 85. As a result a very true steering motion is obtained.

Figure 7:
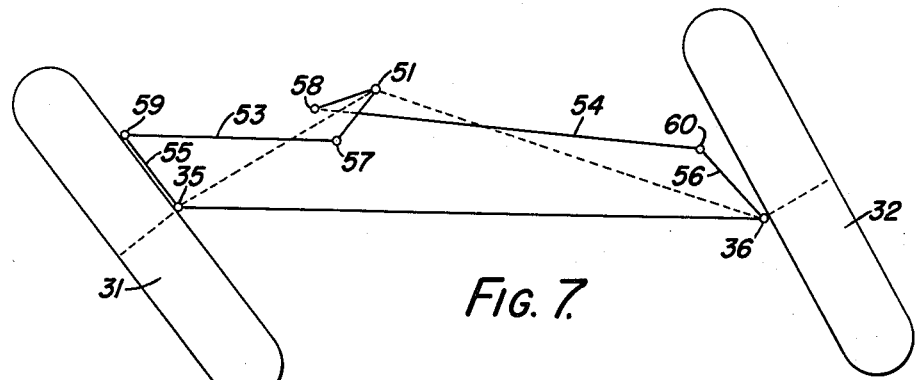
Fig. 7 is a diagram of the same linkage showing the wheels turned to the left to their extreme position.

Fig. 6 shows the assembled linkage in its mean position, the position for straight driving. In this, and in the following figures the top of the figure corresponds to the front of the vehicle. Fig. 7 shows the same linkage in an end position, set for a sharp left hand turn.

It should be noted that the knuckle arms 55 and 56 have the same length, but that they are differently inclined to the planes of rotation of their wheels. The knuckle arm to the right is more inclined, that is, the knuckle arm connected with the longer tie rod 54 is more inclined than the one connected with the shorter tie rod 53.

A most important feature of my invention will now be described with reference to Figs. 8 to 11. The embodiment here illustrated is for use with independently sprung front wheels 31 and 32. The independent spring here shown is of known type, each steering knuckle being journaled in a part 90 which is guided by what is generally called parallel linkage. Part 90 forms the connecting link between an upper and a lower lever mounted on parallel pivots. At least in a mean position the two levers are parallel. The would stay parallel in all positions if the levers were of equal length. In practice, the lower lever is made longer than the upper lever. This linkage is not completely illustrated as it is well known and does not form part of my invention. Only the lower lever 91 is indicated. Parallel axes 92 and 92' pivotally connect said lever with the part 90 and with a member 93 which forms part of the frame of the vehicle.

In springing, the ball joints 59 and 60 of the knuckle arms 55 and 56, respectively, describe curves, which especially at the middle portion closely coincide with circular arcs. If the levers of the parallel linkage were equal in length, these curves would be exactly circular arcs having a radius equal to the length of the levers. As it is, each curve is approximately a circular arc; and the radius of the curve depends on the vertical position of the ball joint. The radius is equal to the larger radius of the lower lever if the ball joint is on the level of the lower lever. It would be equal to the smaller radius of the upper lever if the ball joint were at the level of the upper lever. The higher the ball joint is, the smaller is the radius of the arc it describes in swinging.

To make the steering motion independent of the springing motion, each tie rod should pivot about the center of the springing motion or at least about a center close to it. This is solved by arranging the steering knuckle arms of the two road wheels and their tie rods at different vertical levels. The tie rod and the knuckle arm of the wheel nearer to the pivoted member is disposed higher than the tie rod and the knuckle arm of the other wheel to shorten the radius of swing in springing. The vertical level is so determined that the axis of swing of the shorter tie rod, in springing, approximately passes through the ball joint of this tie rod at the pivoted member. This keeps the steering position of the wheel, which is connected to this tie rod, independent of its springing position. Thus, on the shorter tie rod the center of springing motion is displaced to pass through ball joint 57 by raising both ball joints 57 and 59 and their tie rod 53. The two tie rods then operate at different levels. The short tie rod operates at a higher vertical level than the longer tie rod, in order to make the ball joint 57 the center of swing of the ball joint 59 by shortening the radius of the swing.

This procedure of displacing the tie rod vertically, so that its axis of swing will pass through the ball joint that connects the tie rod with the pivoted actuating member, while satisfactory for the shorter tie rod, would not be practical on the longer tie rod as the longer tie rod would then have to be too close to the ground. The dotted line 95 represents the axis of swing of the ball joint 60. To keep the steering motion independent of the springing motion, the longer tie rod should be capable of pivoting about a point 96 lying on the axis 95.

To achieve this pivotal motion of the longer tie rod an articulated tie rod is provided for the longer link connection. This is one of the important features of the present invention. The longer tie rod 54 is made in two parts 100 and 101. Instead of using a ball joint at point 58, the ball joint is, so to say, split up into a vertical pivot 58' and into a horizontal pivot 103. The latter intersects the center line of the articulated tie rod at point 96 of the axis 95 of swing.

The part 100 of the longer tie rod is a tube of rectangular or square cross-section. At its left end this part is pivotally connected to pivoted actuating member 50. For this purpose, a piece of circular tubing 105 (Fig. 11) is introduced into the rectangular opening of the part 100, fitting the sides of said opening. A pair of axially-aligned cylindrical openings coaxial with tube 105 are then punched and pressed into the part 100 to receive a cylindrical pin 106 with a press fit. The pin 106 is journaled at both ends in a forked portion 107 of the pivoted member 50. Of course, any other suitable way of securing a pin to the part 100 might also be used.

At the opposite end of the part 100, another pin 110 is secured to the part 100 with a press fit. This pin is disposed at right angles to the direction of the pin 106. Its ends bear in the forked portion 111 of part 101 of the tie rod. The two parts 100 and 101 of the tie rod are thereby jointed together to move on each other about the axis of the pin 110 while being fixed lengthwise of said axis.

In any given position of springing, the articulated tie rod acts exactly like a rigid one. In the plan view of Fig. 8 its motions are determined exactly as for a rigid tie rod. The difference lies in the fact that the articulated tie rod permits independent springing without altering the steering position.

Figure 9:
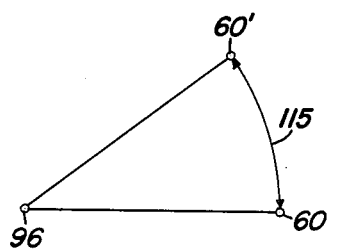
Fig. 9 is a diagram illustrating the springing action when a mechanism of the type shown in Fig. 8 is used.
Figure 10:
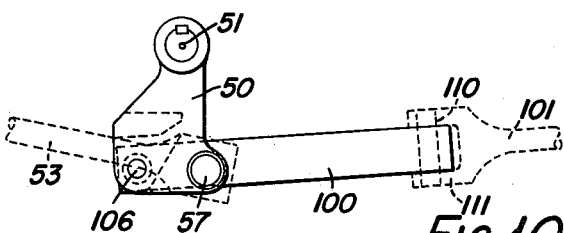
Fig. 10 is a fragmentary plan view showing some of the parts of Fig. 8 on an enlarged scale.
Figure 12:
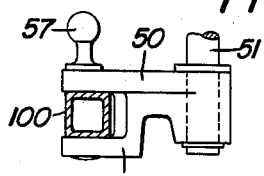
Fig. 12 is a section on the line 12—12 of Fig. 11 looking in the direction of the arrows.

The action is further illustrated in the diagram of Fig. 9. Ball joint 60 of the knuckle arm 56 swings in an arc 115 (shown exaggerated) in a given steering position to a position 60'. The plane of this arc is perpendicular to the axis of swing 95. The circular arc also lies in a spherical surface centered at 96.

Figure 8:
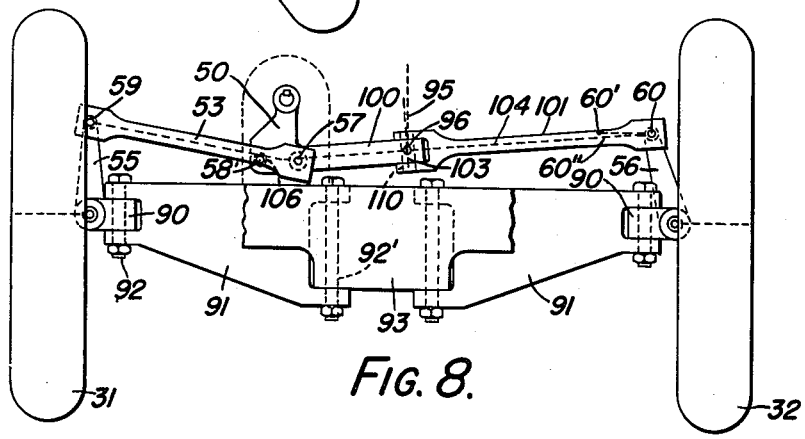
Fig. 8 is a plan view of a linkage, such as illustrated in the diagrams of Figs. 4 and 5, applied to independently sprung front wheels, and incorporating, also, an articulated link or tie rod.

The plane of the circular arc described by the ball joint 60, when swung about horizontal pivot 110, is perpendicular to said pivot so that the joint center attains a position 60″ (Fig. 8). This position is also on said sphere. It could be made to coincide with position 60′ through a very small turning motion about a vertical axis passing through point 96. Instead, the last-named small motion can be made about the axis of the vertical pivot 106. This produces the same direction of motion of point 60″. It is seen that when the wheel springs at a given steering position, the part 101 of the tie rod tips up, and the whole tie rod moves very slightly about the axis of the vertical pivot 106, but the pivot axis and the pivotal actuating member 50 do not move. The steering position of the wheel 31 does not change either through springing. In other words, in my design springing does not affect steering.

Figure 11:
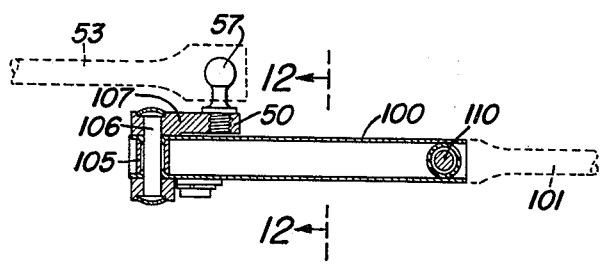
Fig. 11 is a part side elevation, part section of the parts shown in Fig. 10.

It should be noted, as is seen clearly in Fig. 11, for instance, that the pins 106 and 110 are made to bear adjacent their ends while their middle is held rigid. The spaced bearings give better control. The pins carry moderate moments of steering loads exerted in sprung positions. The bearing loads resulting therefrom are reduced in the inverse proportion of the spread of the bearing surfaces.

With the articulation in accordance with my invention, it is important that individual pivot axes are used rather than an extra joint in addition to a ball joint. These axes keep the position definite. The pivot 110 is constrained to move in a horizontal plane perpendicular to the axis of the pin 106 and to axis 51.

Suitable known oil seals or grease seals may be used. One form of stationary seal which may be used in the mechanism of the present invention will further be described hereinafter.

Figure 13:
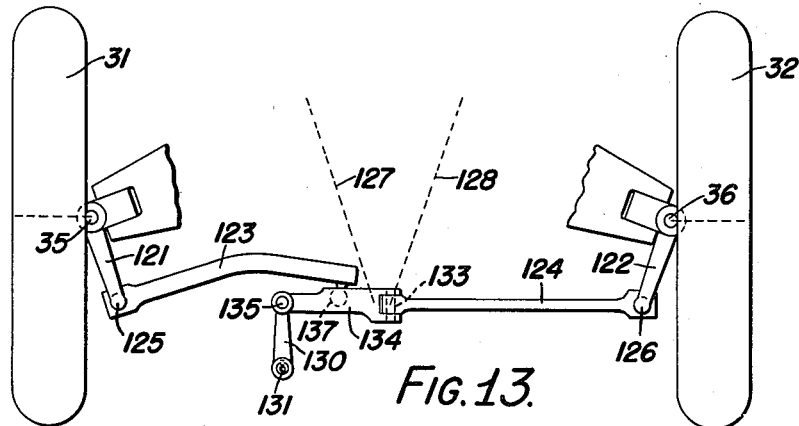
Fig. 13 is a plan view of a different embodiment of the invention, showing the articulated tie rod of the present invention applied to a known form of linkage.

The articulation feature of the present invention may be applied to various types of steering mechanisms. Fig. 13 shows an adaptation of my articulated tie rod to a known form of steering linkage. The two wheels 31 and 32 are mounted to swivel about steering knuckles 35 and 36. These steering knuckles are connected by means of knuckle arms 121 and 122 with link members 123 and 124, the connections being by means of ball joints 125 and 126, respectively. The wheels 31 and 32 are independently sprung by parallel type linkages so that said ball joints move about axes 127 and 128 in springing at a given steering position. The steering motion is controlled from a pivotal member 130 having an axis 131 preferably vertical. The member 130 is connected with the knuckle arm 122 of the right hand wheel 32 through a tie rod which is made according to the present invention in two parts 124 and 134, instead of, as in the conventional design in a single piece. The tie rod is attached to the arm 122 by the ball joint 126. The two parts 124 and 134 of the tie rod are jointed together by a horizontal pin 133. This pin is so positioned that in a mean position its axis intersects the axis 128 of swing in a mean point. Because of the articulation, then, the springing motion therefore does not affect the steering position. Part 134 is attached to the pivotal actuating member 130 through a pivot 135 which is parallel to the axis 131 of the member 130. Through this connection the pin 133 is constrained to move in a plane perpendicular to the axis of pivot pin 131, that is, in a horizontal plane.

The tie rod 123 of the other wheel 31 is attached to the part 134 by means of a ball joint 137. A conventional constraint may be used to prevent the bent tie rod 123 from tipping down.

Further applications of the articulated linkage are illustrated in Figs. 14 to 19 inclusive. In these embodiments, the steering motion is identical with the well known motion of the trapezoidal linkage which is widely used. The articulation is for the purpose of permitting springing without affecting the steering position.

Figure 14:
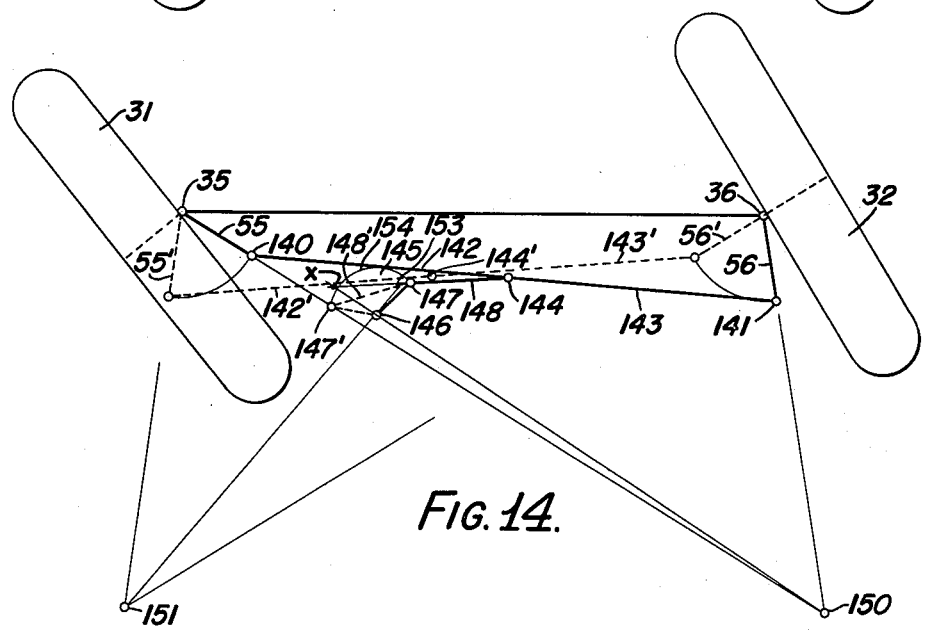
Fig. 14 is a diagrammatic view showing a further embodiment of the invention.

The principle is illustrated in Fig. 14 which shows the linkage in one end position in full lines and which shows the linkage in the opposite end position in dotted lines. The two knuckle arms 55 and 56 are connected to opposite ends of an articulated tie rod by means of ball joints 140 and 141. As far as the steering motion is concerned, the articulated tie rod acts exactly like a solid tie rod. It is composed of two parts 142 and 143 of equal length which are hinged together by a horizontal pivot 144. The steering motion is effected through a pivoted member 145 having a vertical axis 146 offset from the longitudinal center line of the vehicle. This member has a pivot 147 parallel to its axis on which is journaled a link part 148. This part is connected with the articulated tie rod at or near its pivot 144 through a pivot parallel to the pivot 147. The part 148 operates the steering motion and constrains the pivot 144 to move in a horizontal plane.

The drive from the axis 146 through the tie rod is preferably made so that the same instantaneous ratio exists between the steering motion of the wheels and the turning motion about the axis 146 at both end positions. In other words, the same infinitesimal steering motion of the wheels should require equal infinitesimal turning angles about the axis 146 at both end positions.

This is accomplished through first determining the instantaneous axis 150 about which the tie rod moves at the end position shown in full lines. This axis lies at the intersection of the extended knuckle arms 55, 56. The instantaneous axis 151 for the other position is determined in the same way. Then I draw the center line 148′ of link part 148 for the end position shown in dotted lines. This center line is drawn through the point 144′ (the position of the point of connection of link part 148 to the tie rod 143 in the dotted line position 143′ of this tie rod) at as large an inclination as is compatible with good leverage. The position of axis 146 of pivotal member 145 is then assumed. We now draw the center lines 151—146 and 150—146. The line 148′ intersects the corresponding center line 151—146 at a point 153. Line 148, when known, intersects center line 150—146 in another point X (not shown), which will presently be determined.

To have the same instantaneous ratio at both end positions, the proportion $$\frac{\text{distance } 146\text{—}153}{\text{distance } 151\text{—}153}$$

should be equal to the proportion $$\frac{\text{distance } 146\text{—}X}{\text{distance } 150\text{—}X}$$

From this requirement it follows that the point X of the center line 150—146 should lie on a line drawn through point 153 parallel to the horizontal line 150—151 (not shown) which connects the two instantaneous axes or centers. Thus, the point X is determined. The line 148 can then be drawn as the straight connection between the points X and 144. Pivot 147 is now determined by trial. A circle 154 is drawn about the center 146 with an assumed radius 146—147. This circle intersects the lines 148 and 148′ in two points 147 and 147′. The radius of the circle may be changed until the length of the link part is equal for both end positions, that is, until 144—147 is equal to 144′—147′. In this way, a practical drive for the steering linkage is obtained. Preferably the axis 146 is assumed close enough to the line 144′—147′ that the turning angle 147—146—147′ is well over a right angle.

Figure 15:
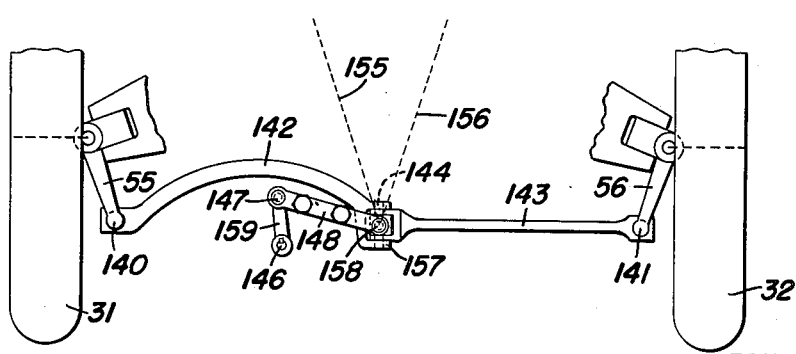
Fig. 15 is a plan view of a steering mechanism constructed in the manner illustrated diagrammatically in Fig. 14.
Figure 23:
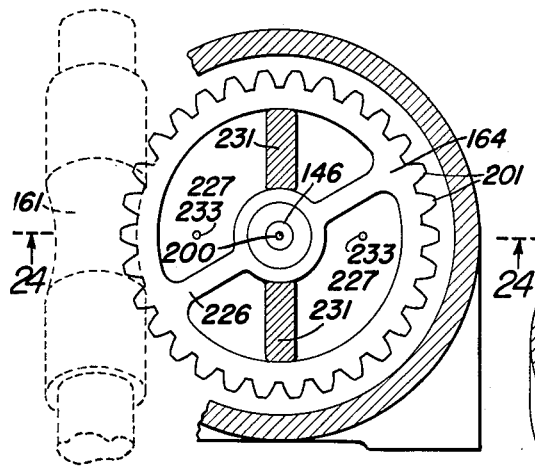
Fig. 23 is a fragmentary sectional view through the steering gear housing, showing in full lines the worm wheel and in dotted lines the driving worm of a steering mechanism constructed according to this invention, and having a shock absorber combined therewith.

Fig. 15 shows the application of these principles to a mechanism for steering front wheels 31 and 32 which are independently sprung and guided by parallel type linkages. The same reference numerals are used in Fig. 15 to designate parts identical with those shown in Fig. 14. Ball joint 140 of knuckle arm 55 springs as if turned about a horizontal axis 155. Ball joint 141 of knuckle arm 56 springs as if turned about a horizontal axis 156.

The two axes and the two ball joints are all on the same level. Part 142 of the articulated tie rod is curved so as to be out of the way of the pivot 147 and attached parts. This pivot extends beyond the connecting line of the ball joints 140 and 141 in the middle position shown in Fig. 15. The parts 142 and 143 of the articulated tie rod are forked to receive the horizontal pivot 144. The horizontal pivot is in the form of a pin 157 which is secured to a center piece that has a vertical pivot 158. The axis of the latter intersects the axis of the horizontal pivot. The vertical pivot is rockably connected with link part 148 which is in two halves rigidly secured together. At its opposite end, the link part 148 rotates on the vertical pivot 147 of the pivotal actuating member 159 which swings about the pivot 146. Again, the articulated tie rod 142—143 permits of holding a steering position at all degrees of springing.

While the embodiment of Fig. 15 has a single axis of articulation, a similar embodiment, shown in Figs. 16 to 19 inclusive, has an articulated tie rod with two parallel axes of articulation placed close together. This results in simpler tie rod ends. Also with this design it is not necessary to split the link part 148 of Fig. 15. It can be made in a single piece.

Again the wheels 31 and 32 are independently sprung through the known and already outlined parallel link type suspension. The part 167, on which the steering knuckle 35 is mounted, is the connecting link between a pair of levers pivoted on parallel axes on the frame of the vehicle, or its equivalent, or on a part rigidly secured thereto. The disposition of the springs and shock absorbers are well known and do not need to be shown since they form no part of the present invention. The knuckle arms 55 and 56 are at the same vertical level and so are their ball joints 140 and 141. In springing, the centers of the ball joints swing as if turned about horizontal axes 170 and 171, respectively. The parallel axes 172, 173 of articulation of the tie-rod assembly preferably pass through the points at which the axes 170, 171 intersect the longitudinal center line of the tie rod, that is, the connecting line of the centers 140—141.

The short central connecting portion 175 of the tie rod parts 142', 143' is shown in plan view in Fig. 18 and in section in Figs. 17 and 19. It has the general shape of the letter H. The ends of the tie rod parts 142', 143', reach into the spaces at the opposite ends of the connecting part 175; and the tie rod ends are secured to the connecting part 175 by the pins 176 and 177. The bearing portions of the pins are at their outer ends to obtain maximum control. The sides of the tie rod ends also bear against the sides of the central portion 175. Any suitable grease or oil seal may be used. Seal 178 seals the sides of the pivoted parts. Seals 179 are end caps without relative motion. They very tightly fit the sides of the recesses 180 (figs. 21 and 22) formed in the part 175 at the ends of the pins 176.

Each seal 179 is a flexible cap. Fig. 22 shows a seal 179 after insertion in a recess 180 and before the seal is tightened. The seal or cap is tightened by a downward pressure strong enough to stress the cap beyond its elastic limit. This pressure expands the periphery of the cap so that its beveled sides 181 dig into the sides of the recess and provide a permanent tight fit. It is rarely necessary to open the seal. However, to reopen the seal, the cap 179 is destroyed and replaced. The cavity inside the cap serves to store some lubricant.

The link part 160 has a forked end 185 (Fig. 19) which fits the head 186 of lever arm 165. This lever arm is pivotally connected to link part 160 by a pin 187 which is rigidly secured to arm 165 by a press fit and which has a vertical axis parallel to the axis of the pivot 146 (Figs. 16 and 17). The pin 187 bears rockably in the arms of the forked end 185 of link 160. Seals are provided to retain the lubricant. These seals may be end caps 179 such as already described.

Link part 160 tapers in thickness from the forked part 185 to its opposite end. Near its middle portion it has a cross section like an I beam shown in Fig. 20. It carries a vertical pivot 190 that is formed integral with or rigidly secured to it. This pivot fits into the bore 191 (Fig. 18) of the connecting member 175 and is journaled therein. It is held axially through a washer 192 and a snap ring 193, or in any other suitable way. Seals 179 may be used at top and bottom.

The tie rod part 142' is curved or bent to keep it out of the way of the forked link 160. It also has an I beam cross section as shown in Fig. 17. The tie rod part 143' is straight.

The two main parts 142' and 143' of the articulated tie rod are in line with each other so that the connecting line of the center point of the pin 176 and the center of the ball joint 140 lie in the same straight line as the connecting line of the center point of the pin 177 with the center of the ball joint 141. In other words, these individual lines form part of the connecting line 140—141.

The forked end 185 of link part 160 reaches beyond and crosses the line 140—141 in the central position of the steering mechanism. In this position this line 140—141 is parallel to the connecting line of the two knuckle centers 35, 36. Except for the double articulation, the steering linkage shown in Fig. 16 conforms to the embodiment of the invention illustrated diagrammatically in Fig. 14. The steering motion is the same as for a rigid tie rod 140—143. The articulation permits springing of the wheels without affecting the steering position. A simple design is obtained by the present invention without sacrificing the steering action and its independence of the springing position.

The steering mechanism shown in Fig. 16 is driven through a worm 161 that is secured to the lower end of the steering shaft 162 and is coaxial with that shaft and rigidly secured thereto. The worm 161 meshes with a conjugate worm wheel 164 which is mounted on a vertical axis 146. The worm and worm wheel are, of course, suitably enclosed. The worm wheel 164, its shaft with the vertical axis 146, and the lever arm 165 rigidly secured to the shaft constitute the pivoted member for operating the steering mechanism. As before, this member is offset from the longitudinal center line of the vehicle.

The steering gear assembly itself is shown in detail in Figs. 23 to 26. The assembly shown is applicable directly to a pivoted member with a vertical axis offset from the longitudinal center line of the vehicle such as is the case in the steering mechanism of Fig. 16. However, the steering gear shown has general application.

In the steering drive shown, the worm wheel 200 has straight teeth 201 which extend parallel to the axis 200 of the bearing pin 146. These teeth may be made like spur gear teeth. The hour-glass worm 161 is conjugate to these teeth. This drive differs from known drives between a spur gear and a worm set at right angles thereto in that the inclination of the spur teeth matches the direction of the worm thread at a point within the outside diameter of the worm. The point of contact 203 (Fig. 24) on the line 204 of centers of worm and worm wheel preferably lies between the outer and inner boundaries of the teeth. In other words, the worm has a lead angle equal to the complement of the shaft angle at an intermediate point 203 of the thread profile. Broadly the teeth of the worm wheel have a generally axial direction in this angular steering gear drive.

Figure 24:
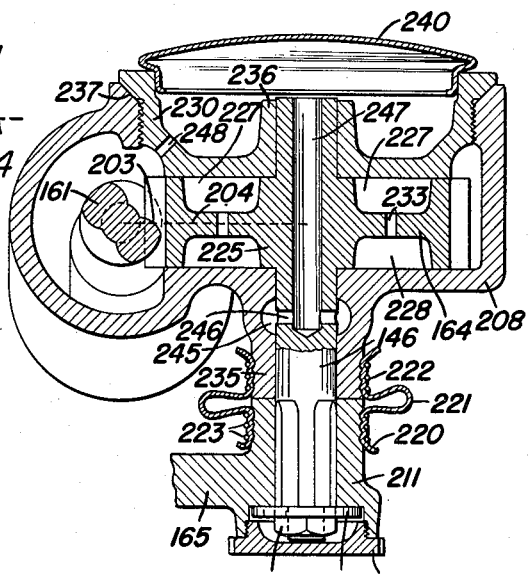
Fig. 24 is an axial sectional view through the worm wheel and housing.
Figure 25:
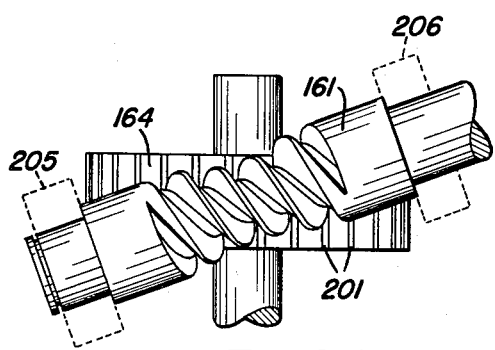
Fig. 25 is a view of the worm and worm wheel taken at right angles to the view of Fig. 24.
Figure 26:
Fig. 26 is a diagrammatic developed section showing the structure of the shock absorber which is combined with the worm wheel.

The worm 161 is mounted in anti-friction bearings 205, 206 indicated in dotted lines in Fig. 25. The outer races of these bearings are held by the steering gear housing 208 (Fig. 24).

The worm wheel 164 is formed integral with its shaft 146. The lower end of this shaft is splined; and the hub 211 of lever 165 is attached thereto. It is fastened in axial position by a washer 213 and a nut 214, the latter being threaded onto the end of the shaft 146. Protection and sealing of this end is accomplished by a threaded cap 215, which threads into the hub portion of the lever arm 165.

A conventional oil seal may be used between the housing 208 and the hub 211. I prefer, however, to use for this purpose a tube 220 made of rubber, neoprene, or the like. This tube has a bulge 221 in it. It is tightly secured to an extension of housing 208 by a wire 222; and it is tightly secured to the upper portion of the hub 211 by a wire 223. During the motion of the lever 165 the tube 220 deflects but is very tightly held at both ends so that leakage is avoided.

An important novel feature of the steering mechanism of the present invention is the combination of a shock absorber with the worm wheel 164, or broadly with the larger member of the steering gear. This shock absorber prevents transmission of road shocks to the steering mechanism.

The body portion of the worm wheel 164 has two arcuate recesses 227 formed in its upper side and two similar arcuate recesses 228 formed in its underside. These recesses are separated on both sides by diametral ribs 226. Threaded into the upper end of the housing 208 is a member 230 which is provided with radial projections or paddle members 231 which engage in the upper recesses 227. The housing 208 is formed with similar radial projections or paddle members which reach into the lower recesses 208. The fit between the recesses and projections is loose. The recesses may be coined or cast. The recesses formed are shown in development in Fig. 26.

The worm wheel 164 and its shaft 146 are mounted in bearings 235 and 236 provided in the housing 208 and the member 230, respectively. As already stated, the member 230 is threaded into the housing. It is centered therein by a conical surface 237 which is provided thereon and which fits into a complementary conical surface of the housing. A cover 240 seals off the top of the housing. Member 230 may be provided with radial reinforcement ribs (not shown) which may serve as hand-holds for tightening up this member in the housing.

The upper and lower recesses 227 and 228 of the worm wheel are preferably connected by bores 233 to keep the pressure equalized. When the worm wheel turns, oil is displaced between the recesses. At slow motion, as occurs with hand operation of the steering wheel, there is a moderate rise in pressure on the side where the volume is being reduced as the oil by-passes the loosely fitting parts. Sudden jerks such as caused by road shocks have, however, very little effect. Abrupt motion of the worm wheel 164 is impossible, since the oil would not have time to rush through the narrow passages provided by the loose fit. A high oil pressure, is instantly built up, which prevents excessive speed. Accordingly, road shocks are absorbed and not transmitted to the steering wheel. Furthermore, the shock absorber provides a remedy against shimmy. Moreover, gear wear is reduced. Since the shock absorber is combined with the steering gear member, the provision of this shock absorber entails very little additional cost.

The combination of a shock absorber with the larger member of a steering gear pair presents sealing difficulties. The high oil pressures occurring at times would tend to press some oil out even through the best of seals. A continued repetition of this process would cause a lack of sufficient oil.

The difficulty is overcome by keeping the high pressures away from the seals. An annular recess 245 (Fig. 24) is provided in the housing 208 around the shaft 146 between the pressure chambers of the worm wheel and the seal 220. This recess connects with the free oil level at the top of the housing through a radial bore 246, which is drilled through shaft 146, and which, in turn, connects with an axial duct 247 in the shaft 146. Whenever pressure tends to build up in the opening 245, the oil escapes through the ducts 246 and 247 to the top of the housing so that no substantial pressure increase results. Accordingly, the oil seal can function reliably.

Bores 248 provided in the member 230 form communicating ducts between the oil on top and the space around the steering worm 161. No undue pressure can, therefore, build up there either.

Figure 27:
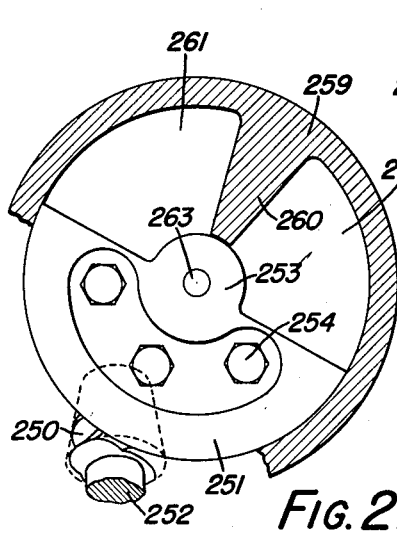
Figs. 27 and 28 are sectional views similar to Figs. 23 and 24 illustrating a modification of the invention, in which a hypoid gear pair is substituted for the worm and worm wheel but in which a shock absorber is also combined with the larger member of the gear pair.
Figure 28:
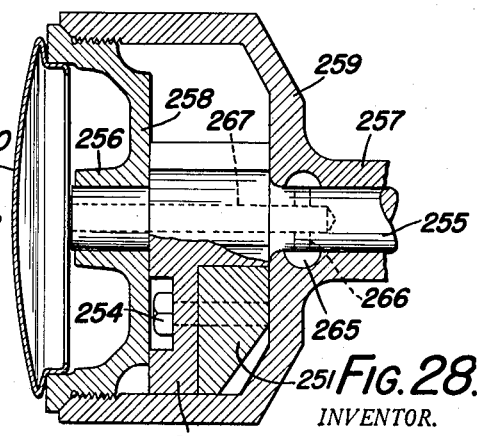

A modified steering gear assembly with shock absorber is shown in Figs. 27 and 28. Like the form of the invention just described, it can be used for driving the pivoted control member in any of the described embodiments of the invention.

Here the steering drive is through a hypoid gear pair comprising a hypoid pinion 250 and a hypoid gear segment 251. The pinion is secured to the steering shaft 252 to which the steering wheel (not shown) is fastened. The segment is secured to the pivoted member 253 by screws 254. This pivoted member is formed integral with shaft 255. It is mounted in bearings 256 and 257 in the top member 258 and housing 259, respectively.

The housing 259 has a radial projection 260 which separates the space back of the gear segment and its holder into compartments 261 and 262. These are completely filled with oil. When the segment runs on its vertical axis 263 the volume of one of said compartments is reduced, while the volume of the other compartment is correspondingly increased. The oil in the shrinking compartment is pressed out of it through the loose fit provided and finds its way to the other compartment. Pressure is built up increasingly with increasing speed and again prevents excessive speed just as in the embodiment of the invention shown in Figs. 23 to 26 inclusive. The pressure and resistance is substantially proportional to the square of the speed. At slow speed, little resistance is encountered with proper design of looseness while a strong force opposes high speeds. As before, to prevent excessive pressure squeezing oil out of the seals, an annular groove 265 is provided around the shaft 255, and this is connected by a radial duct 266 and an axial duct 267 with the top of the member 258. A cap 270 closes the upper end of the housing.

Among the main features of the invention are the provision of an articulated tie rod or link to keep the steering motion independent of the springing motion, an improved linkage arrangement which also permits the use of turning angles well over a right angle on the pivoted control member, and an improved steering gear assembly with a built-in shock absorber.

While the invention has been described in connection with several different embodiments thereof, it will be understood that it is capable of further modification, and the present application is intended to cover any variations, uses, or adaptations of the invention following, in general, the principles of the invention and including such departures from the present disclosure as come within known or customary practice in the art to which the invention relates and as may be applied to the essential features hereinbefore set forth and as fall within the scope of the invention or the limits of the appended claims.

Having thus described my invention, what I claim is:

1. A steering mechanism for an automotive vehicle, comprising a pair of steering knuckles mounted in the vehicle for swivelling the movement and on each of which is rotatably mounted one of the front wheels of the vehicle, a knuckle arm projecting from each steering knuckle, a pivoted control member, a linkage connecting said control member and said knuckle arms to swivel the steering knuckles on pivotal movement of the control member, a steering shaft, gears connecting the steering shaft to the control member, one of said gears being coaxial with the control member and rigidly secured thereto, a housing in which said one gear and the control member are mounted, and a shock absorber combined with said one gear and said housing and of which said one gear forms a part, said housing having a liquid-filled closed compartment therein, and said shock absorber comprising a projection which is secured to said one gear to move therewith and which is movable in said compartment, an oil seal between the pivoted member and said housing extending about the axis of said one gear, and means for keeping high pressure away from said oil seal, said last named means comprising a low pressure oil duct in said housing about the shaft of said one gear adjacent said seal, and a duct in said shaft communicating with the first named duct and leading to the top of said housing above said shock absorber.

2. A steering mechanism for an automotive vehicle comprising a pair of steering knuckles mounted in the vehicle for swivelling movement and on each of which is rotatably mounted one of the front wheels of the vehicle, a knuckle arm projecting from each steering knuckle, a pivoted control member whose axis is inclined to a horizontal plane, a linkage connecting said control member and said knuckle arms, a steering shaft whose axis is offset from the axis of said control member and inclined at an acute angle to a plane perpendicular to the last-named axis, and a worm and wormwheel connecting said shaft with said control member, said wormwheel being secured to a rotary shaft and having recessed plane sides with a diametrical rib on each side, a housing in which said control member and wormwheel are mounted, said housing having projections reaching into the recesses of the wormwheel to form a pair of shock absorbers, an oil seal about the shaft of the wormwheel between the control member and the housing adjacent the lower end of the worm wheel shaft, an annular groove provided in the housing between the shock absorber and the oil seal, and said wormwheel shaft having an axial duct between said groove and the top of the housing.

3. A steering mechanism for an automotive vehicle comprising a pair of steering knuckles mounted in the vehicle for swivelling movement and on each of which is rotatably mounted one of the front wheels of the vehicle, a knuckle arm projecting from each steering knuckle, a pivoted control member whose axis is inclined to a horizontal plane, a linkage connecting said control member and said knuckle arms, a steering shaft whose axis is offset from the axis of said control member, gears connecting the steering shaft and the control member, one of said gears being secured to the control member, a housing for the control member and enclosing the control member and said one gear, said one gear having a diametral rib, a shaft to which said one gear is secured, a projection on the housing which cooperates with said diametral rib to provide two compartments adapted to contain oil, and an oil seal for preventing leakage from said compartments, said oil seal comprising a closed flexible tube which is secured to the housing at one end and to said control member at its opposite end and which surrounds said second-named shaft, and means for keeping high pressure away from said seal comprising an internal annular groove in the housing about said second-named shaft between the compartments and the seal, and a duct connecting said groove with a reservoir in the top of said housing.

4. A steering mechanism for an automotive vehicle comprising a steering shaft, a pivoted control member, gearing operatively connecting said steering shaft with said control member, a pair of steering knuckles mounted in the vehicle for swivelling movement and on each of which is rotatably mounted one of the front wheels of the vehicle, a knuckle arm projecting from each steering knuckle, an articulated tie rod connected to said knuckle arms, said tie rod comprising at least two parts which are connected together by a pivot with a single horizontal axis, and means connecting said control member to said tie rod to move said tie rod on pivotal movement of said control member, said means also constraining said last-named axis to move in a substantially horizontal plane, said means including a link pivotally connected at one end to said articulated tie rod and pivotally connected at its opposite end to said control member, the axes of the pivots of said link being parallel to the axis of the control member.

5. A steering mechanism for an automotive vehicle comprising a steering shaft, a pivoted control member offset from the longitudinal center line of the vehicle, gearing operatively connecting said steering shaft with said control member, a pair of steering knuckles mounted in the vehicle for swivelling movement and on each of which is rotatably mounted one of the front wheels of the vehicle, a knuckle arm projecting from each steering knuckle, an articulated tie rod connected to said knuckle arms, said tie rod comprising two parts connected together by a pivot with a single, substantially horizontal axis, and means connecting said control member to said tie rod to move said tie rod on pivotal movement of said control member, said means also constraining said axis to move in a substantially horizontal plane, said means comprising a link pivotally connected at one end to said control member by a substantially vertical pivot and at a point offset from the axis of said control member, said link being connected at its opposite end to said tie rod also by a substantially vertical pivot.

6. A steering mechanism for an automotive vehicle with independently sprung front wheels, comprising a pair of steering knuckles mounted in the vehicle for swivelling movement and on each of which is rotatably mounted one of the front wheels of the vehicle, a knuckle arm projecting from each steering knuckle, an articulated tie rod, ball joints connecting the tie rod to the two knuckle arms, said articulated tie rod comprising at least two parts, said two parts being joined together by a pivot having a single, substantially horizontal axis, a pivoted control member having an approximately vertical axis offset from the longitudinal center line of the vehicle, a link pivoted at one end to said control member on an axis parallel to the axis of the control member and pivotally connected at its opposite end to said tie rod adjacent said horizontal pivot, the part of the tie rod adjacent said control member being curved away from said member, and said tie rod being supported wholly by said ball joints and said link.

7. A steering mechanism for an automotive vehicle comprising a housing, a pivoted control member mounted in said housing and having a shaft end extending outside of said housing, projections on said control member and in said housing, said projections forming compartments with each other whose volume changes upon pivotal motion of said control member, said compartments being filled with liquid, a sealing sleeve made of deformable material tightly secured at one end to said housing adjacent said shaft end and tightly secured at its other end to said control member about said shaft end, so that one end of said sealing sleeve moves with said control member and the other end thereof stays with said housing, a steering shaft, means operatively connecting said steering shaft and said control member, and linkage means connecting said control member with the front wheels of the vehicle to swivel said front wheels upon turning said steering shaft.

References Cited in the file of this patent

UNITED STATES PATENTS

| | | |
|---|---|---|
| 1,695,219 | Windsor | Dec. 11, 1928 |
| 1,873,447 | McCray | Aug. 23, 1932 |
| 2,060,804 | Friestadt | Nov. 17, 1936 |
| 2,075,085 | Paton | Mar. 30, 1937 |
| 2,095,566 | Lundelius | Oct. 12, 1937 |
| 2,246,661 | Best | June 24, 1941 |

FOREIGN PATENTS

| | | |
|---|---|---|
| 465,635 | Great Britain | May 11, 1937 |